(12) United States Patent
Chang et al.

(10) Patent No.: US 9,185,737 B2
(45) Date of Patent: Nov. 10, 2015

(54) METHOD FOR CONTROLLING MULTIPLE COMMUNICATION SYSTEMS TO IMPLEMENT COMMUNICATION AND USER EQUIPMENT

(71) Applicant: Huawei Technologies Co., Ltd., Shenzhen, Guangdong (CN)

(72) Inventors: Junren Chang, Beijing, CA (US); Yajuan Li, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 13/847,398

(22) Filed: Mar. 19, 2013

(65) Prior Publication Data

US 2013/0215809 A1    Aug. 22, 2013

Related U.S. Application Data

(63) Continuation of application No. PCT/CN2011/074968, filed on May 31, 2011.

(30) Foreign Application Priority Data

Sep. 28, 2010   (CN) .......................... 2010 1 0294840

(51) Int. Cl.
*H04W 76/04* (2009.01)
*H04W 52/02* (2009.01)
*H04W 88/06* (2009.01)

(52) U.S. Cl.
CPC ........ *H04W 76/048* (2013.01); *H04W 52/0235* (2013.01); *H04W 88/06* (2013.01)

(58) Field of Classification Search
CPC . H04W 28/04; H04W 52/02; H04W 52/0216; H04W 72/00; H04W 72/04; H04W 76/048; H04W 84/12; H04L 5/0007
See application file for complete search history.

(56) References Cited

U.S. PATENT DOCUMENTS

| 7,688,784 B2 | 3/2010 | Bitran et al. |
| 2007/0291729 A1 | 12/2007 | Dalsgaard et al. |

(Continued)

FOREIGN PATENT DOCUMENTS

| CN | 101039208 A | 9/2007 |
| CN | 101466149 A | 6/2009 |
| CN | 101553054 A | 10/2009 |

(Continued)

OTHER PUBLICATIONS

"Modeling of interference avoidance for in-device coexistence", 3GPP TSG-RAN WG2 Meeting #71, Aug. 23-27, 2010, 10 pages.
International Search Report dated Sep. 8, 2011 in connection with International Patent Application No. PCT/CN2011/074968.

*Primary Examiner* — Andrew Lai
*Assistant Examiner* — Leon Andrews (57) ABSTRACT

A method and a user equipment for controlling multiple communication systems to implement communication are disclosed. The method includes: when a long term evolution LTE system module in a UE is about to enter a discontinuous reception DRX sleep state or to temporarily stop data transmission, sending, by the LTE system module, first indication information to another system module in the UE, where the first indication information is used for indicating, to the other system module, that the LTE system module enters the DRX sleep state and at least part of time during which the LTE system module is in the DRX sleep state, or the first indication information is used for indicating that the other system module is capable of performing data transmission and time during which the other system module is capable of performing data transmission.

10 Claims, 7 Drawing Sheets

(56) References Cited

U.S. PATENT DOCUMENTS

| | | |
|---|---|---|
| 2008/0233875 A1 | 9/2008 | Desai et al. |
| 2008/0318643 A1 | 12/2008 | Manna et al. |
| 2009/0161619 A1 | 6/2009 | Noma |
| 2009/0225717 A1 | 9/2009 | Banerjea |
| 2009/0247218 A1 | 10/2009 | Lee et al. |
| 2010/0238880 A1* | 9/2010 | Wu .............................. 370/329 |

FOREIGN PATENT DOCUMENTS

| | | |
|---|---|---|
| CN | 101558584 A | 10/2009 |
| CN | 101778455 A | 7/2010 |
| WO | WO 2007/148175 A1 | 12/2007 |

* cited by examiner

METHOD FOR CONTROLLING MULTIPLE COMMUNICATION SYSTEMS TO IMPLEMENT COMMUNICATION AND USER EQUIPMENT

CROSS-REFERENCE TO RELATED APPLICATIONS

This application is a continuation of International Application No. PCT/CN2011/074968, filed on May 31, 2011, which claims priority to Chinese Patent Application No. 201010294840.5, filed on Sep. 28, 2010, both of which are hereby incorporated by reference in their entireties.

TECHNICAL FIELD

The present invention relates to the field of communications technologies, and in particular, to a method for controlling multiple communication systems to implement communication and a user equipment.

BACKGROUND

In communication systems, the frequency spectrum is generally divided into different frequency bands. For long term evolution (Long Term Evolution, LTE) systems, a total of 40 available frequency bands are defined, for example, a frequency band numbered 13 (briefly referred to as band 13) from 777 MHz to 787 MHz, a frequency band numbered 14 (briefly referred to as band 14) from 746 MHz to 756 MHz, and a frequency band numbered 40 (briefly referred to as band 40) from 2300 MHz to 2400 MHz. The frequency band from 2.4 GHz to 2.5 GHz (briefly referred to as 2.4G frequency band) is generally used as one of industrial, scientific and medical frequency bands (ISM frequency bands) shared by different countries, this frequency band is neighboring to the band 40 used by the LTE system, and wireless networks such as wireless local area networks, Bluetooth and ZigBee can work on this frequency band. If a user equipment (User Equipment, UE), when using the LTE technology on a frequency band, also uses another wireless communication technology on another frequency band neighboring to the frequency band, the communication of the UE may interfere with the other wireless communication, that is, communication collision occurs between the LTE system and another system.

The prior art proposes a method for solving the above communication interference: The UE sends a request message to a base station, to request the base station to configure, for the UE, time during which the UE is capable of alternately working in two communication systems; the base station sends a response message to the UE, where the message carries information about time that is allocated semi-statically by the base station for the UE to work in each of the two systems; and the UE alternately works in the two systems according to the information of the time allocated by the base station.

However, the above process requires introducing a new configuration function into the base station, which greatly changes the base station; and if some base stations do not support the above function, the terminal cannot obtain the time allocated by the base station for the terminal to work in each of the two systems, thereby affecting effective communication between two systems.

SUMMARY

Embodiments of the present invention provide a method for controlling multiple communication systems to implement communication and a user equipment, so as to coordinate communication between an LTE system and another communication system.

According to an embodiment of the present invention, a method for controlling multiple communication systems in a user equipment UE to implement communication is provided, including:

after a DRX inactivity timer drx-Inactivity Timer of the UE expires, sending, by an LTE system module, first indication information to the other system module in the UE; or after the UE receives a DRX media access control MAC information element, sending, by the LTE system module, first indication information to the other system module in the UE; or if the UE does not receive scheduling information on a PDCCH channel within a timing period of an on-duration timer of the UE, sending, by the LTE system module, first indication information to the other system module in the UE after the on-duration timer expires; or if the LTE system module executes only one hybrid automatic repeat request HARQ process and detects downlink physical downlink control channel PDCCH scheduling information, sending, by the LTE system module, first indication information to the other system module in the UE; or after periodic measurement of the LTE system module in a DRX sleep state is finished, sending, by the LTE system module, first indication information to other system module in the UE, where the other system module and the LTE system module work on different frequency bands; and the first indication information is used for indicating, to the other system module, that the LTE system module enters the DRX sleep state and at least part of time during which the LTE system module is in the sleep state within a current DRX period, or the first indication information is used for indicating that the other system module is capable of performing data transmission and time during which the other system module is capable of performing data transmission.

According to another embodiment of the present invention, a user equipment UE is provided, including: a long term evolution LTE system module and another system module, where the other system module and the LTE system module work on different frequency bands;

the LTE system module is configured to send first indication information to the other system module in the UE after a DRX inactivity timer drx-Inactivity Timer of the UE expires, or after the UE receives a DRX media access control MAC information element, or if the UE does not receive scheduling information on a PDCCH channel within a timing period of an on-duration timer of the UE and the on-duration timer expires, or if the LTE system module executes only one hybrid automatic repeat request HARQ process and detects downlink physical downlink control channel PDCCH scheduling information, or after periodic measurement of the LTE system module in a DRX sleep state is finished;

the first indication information is used for indicating, to the other system module, that the LTE system module enters the DRX sleep state and at least part of time during which the LTE system module is in the DRX sleep state within a current DRX period, or the first indication information is used for indicating that the other system module is capable of performing data transmission and time during which the other system module is capable of performing data transmission; and the other system module is configured to perform data transmission within the at least part of time or within the time during which the other system module is capable of performing data transmission, after receiving the first indication information.

According to another embodiment of the present invention, an LTE system module in a user equipment UE is provided, including one or a plurality of a first detection unit, a second detection unit, a third detection unit, a fourth detection unit and a fifth detection unit, and an indication information sending unit, where the first detection unit is configured to trigger the indication information sending unit after detecting that a DRX inactivity timer drx-Inactivity Timer of the UE expires; or the second detection unit is configured to trigger the indication information sending unit after receiving a DRX media access control MAC control element; or the third detection unit is configured to: if no scheduling information is received on a PDCCH channel within a timing period of an on-duration timer of the UE, trigger the indication information sending unit after the on-duration timer expires; or the fourth detection unit is configured to trigger the indication information sending unit if the LTE system module executes only one hybrid automatic repeat request HARQ process and detects downlink physical downlink control channel PDCCH scheduling information; or the fifth detection unit is configured to trigger the indication information sending unit after periodic measurement of the LTE system module in a DRX sleep state is finished; and the indication information sending unit is triggered by any one of the first detection unit, the second detection unit, the third detection unit, the fourth detection unit and the fifth detection unit to send first indication information to another system module in the UE, where the first indication information is used for indicating, to the other system module, that the LTE system module enters the DRX sleep state and at least part of time during which the LTE system module is in the DRX sleep state within a current DRX period, or the first indication information is used for indicating that the other system module is capable of performing data transmission and time during which the other system module is capable of performing data transmission, and the other system module and the LTE system module work on different frequency bands.

According to the description of the above technical solutions, the embodiments of the present invention has the following advantages: When an LTE system module of a UE is about to enter DRX sleep time or needs to temporarily stop data transmission, the LTE system module may notify another system module that the LTE system module is already sleep, or directly notify the other system module that it can start communication, so that the other system module can make full use of the sleep time of the LTE system module to perform communication, thereby reducing mutual interference between the two systems, and improving the resource utilization efficiency.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following description merely show some embodiments of the present invention, and persons of ordinary skill in the art may still derive other drawings from these accompanying drawings without creative efforts.

DETAILED DESCRIPTION

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
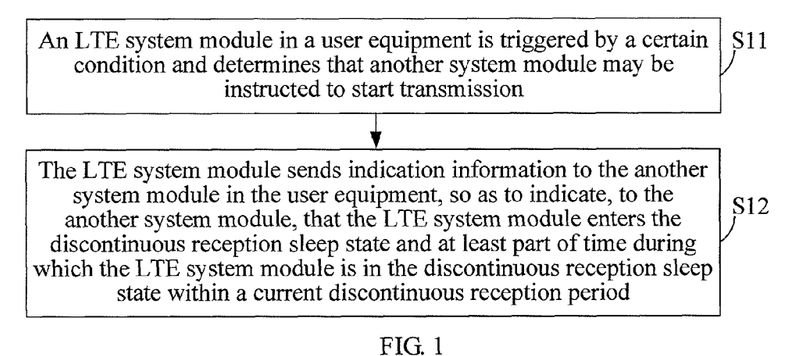
FIG. 1 is a schematic diagram of an embodiment of a method for controlling multiple communication systems in a UE to implement communication according to the present invention.

FIG. 1 is a schematic diagram of an embodiment of a method for controlling multiple communication systems in a UE to implement communication according to the present invention. The method includes the following:

S11: An LTE system module in a UE is triggered by a certain condition and determines that another system module may be instructed to start transmission.

The LTE system module of the UE may detect, when the following cases occurs, whether it is triggered by a certain condition: The LTE system module detects that another system module needs to be started, or when the other system module indicates, to the LTE system module of the UE, that the other system module needs to be started or needs to start service transmission, detects a trigger condition of a DRX (Discontinuous Reception, discontinuous reception) sleep state; of course, the UE may also perform the detection in other time, which is not limited in this embodiment.

Specifically, the UE may detect whether any one of the following events occurs, as a condition with which an LTE system is triggered and may send a notification to another system, that is, it may determine, when any one of the following events occurs, that the LTE system module notifies the other system module in the UE of information indicating that transmission can be started:

1. after a DRX inactivity timer (drx-Inactivity Timer) of the UE expires; the DRX inactivity timer is configured to start the DRX inactivity timer after scheduling information is received on a PDCCH (Physical Downlink Control Channel, physical downlink control channel) in a DRX state, and the timing time of the DRX inactivity timer is used for monitoring the PDCCH by the LTE system module; the DRX inactivity timer may be located in the LTE system module;

2. after the UE receives a DRX MAC (Media Access Control, media access control) control element; the DRX MAC control element is from a base station, and used for instructing the LTE part of the UE to enter sleep;

3. after a DRX on-duration timer (On-duration timer) of the UE expires, no scheduling information is received on a PDCCH channel within a timing period of the DRX on-duration timer; the DRX on-duration timer is started when a DRX period begins, and the LTE system module may monitor the PDCCH within the timing time of the DRX on-duration timer; the DRX on-duration timer may be disposed in the LTE system module;

4. after a current LTE system executes only one HARQ (Hybrid Automatic Repeat Request, hybrid automatic repeat request) process and detects downlink PDCCH scheduling information; an example is given below for illustration, where if the LTE system module has only one HARQ process, when downlink PDCCH scheduling information is received in a certain subframe, it may feed back information to the base station at the fourth subframe, that is, three subframes may temporarily remain idle, and the time of the four subframes may allow another module to perform communication;

5. after periodic measurement of the LTE system module in a DRX sleep state is finished.

Figure 2A:
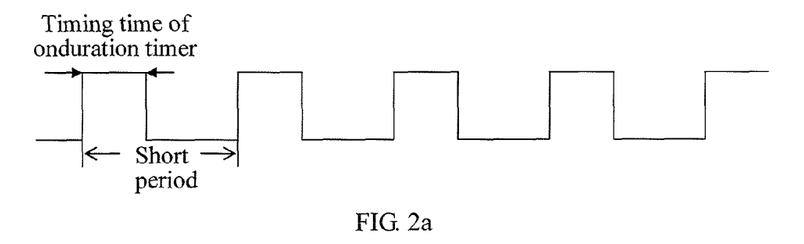
FIG. 2a is a schematic diagram of a DRX working mechanism in an LTE technology according to an embodiment of the present invention.
Figure 2B:
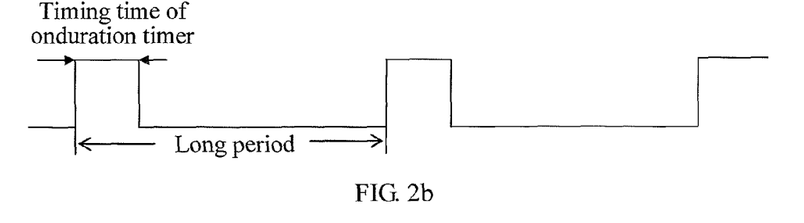
FIG. 2b is another schematic diagram of a DRX working mechanism in an LTE technology according to an embodiment of the present invention.
Figure 2C:
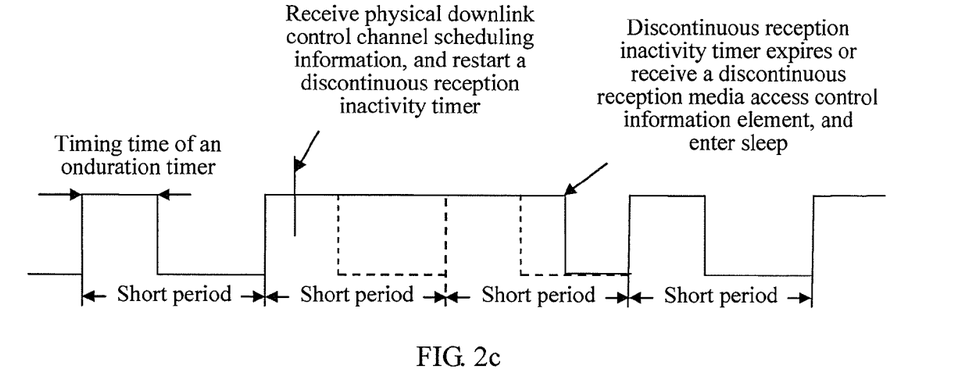
FIG. 2c is another schematic diagram of a DRX working mechanism in an LTE technology according to an embodiment of the present invention.

For ease of understanding, the DRX inactivity timer and the DRX on-duration timer in the LTE system are introduced briefly below with reference to a DRX mechanism of the LTE system. In an existing LTE technology, to reduce the power consumption of the UE, a DRX mechanism is introduced, where the work mode of the mechanism may be shown in FIG. 2a to FIG. 2c. In the LTE technology, the DRX state in an RRC (Radio Resource Control, radio resource control) connection state may include two configuration modes: short DRX period and long DRX period. When initially entering the DRX state, the UE first enters a short DRX period to operate, and after timing of the short DRX period expires, the UE enters a long DRX period. In addition, an eNB (evolved base station, briefly referred to as abase station in the LTE system) of the LTE system may also send a DRX command to instruct the UE to enter the DRX sleep state, so that the UE enters the sleep state immediately after receiving the DRX command. For introduction of the short DRX period and long DRX period in the DRX state, refer to FIG. 2a, FIG. 2b and FIG. 2c for details. In the initial stage of each DRX period, the UE starts a on-duration timer, the UE needs to monitor a PDCCH channel within the timing time of the timer to obtain scheduling information, and if the UE does not receive any scheduling information within the timing time of the timer, the UE stops monitoring the PDCCH and enters the sleep state. For details, reference may be made to FIG. 2a and FIG. 2b. If the UE receives scheduling information on the PDCCH channel within the timing time of the on-duration timer, the UE may start the DRX inactivity timer after receiving the scheduling information, and within the timing time of the DRX inactivity timer, the UE keeps monitoring the PDCCH, and the UE does not enter the sleep state until the DRX inactivity timer expires or a DRX MAC information element is received. For details, refer to FIG. 2c.

S12: The LTE system module sends indication information to the other system module in the UE, so as to indicate, to the other system module, that the LTE system module enters the DRX sleep state and at least part of time during which the LTE system module is in the DRX sleep state within a current DRX period.

In the embodiment of the present invention, the UE may support functions including an LTE system function and another communication system function. The LTE system module is an entity for implementing an LTE communication function in the UE, is also referred to as an LTE part or LTE module, and has the LTE communication function in broad sense, where its specific functions may conform to provisions of any protocol of 3GPP LTE R8 (Release8), R9 and R10, or may include other possible functions of the LTE technology. The other system module is an entity for implementing the other communication function in the UE. The other system is a system different from the LTE system, and works on another frequency band different from the frequency band of the LTE system. The other system may specifically include, but not limited to, a Wifi system or Bluetooth system working on an ISM frequency band, or may also be a system working on another frequency band neighboring to the frequency band of the LTE system, for example, a GPS (Global Positioning System) system, and this embodiment does not limit the specific type of the other system. That the LTE system module enters the DRX sleep state means that the LTE system module enters sleep in the DRX state, that is to say, total time during which the UE is in the DRX state may include time during which the UE is in the DRX sleep state and non-sleep time during which the UE is in the DRX state.

In this embodiment, when the LTE system module is about to enter the DRX sleep time or needs to temporarily stop transmission, the LTE system module may indicate, by sending indication information, that another system module may start communication or that the LTE system module is already sleep, so that the LTE system module and the other system module can work alternately. In this way, mutual interference caused when the two modules start at the same time is reduced, and the other system can make full use of the sleep time of the LTE system to transmit data, thereby effectively utilizing resources while reducing the interference.

The indication information in this embodiment is used for indicating, to the other system of the UE, that the LTE system enters sleep and at least part of the sleep time, so that the other system learns the at least part of the sleep time of the LTE system, and therefore can transmit data during this part of time. However, it may be understood that, the indication information may also directly indicate that the other system module is capable of performing data transmission and time during which the other system module is capable of performing data transmission. The two different expressions achieve substantially the same function, which is to inform the other system of the sleep time of the LTE system or time during which the LTE system stops data transmission, that is, inform the other system of time during which the other system is capable of working without interfering with the LTE. When the indication information directly indicates that the other system module is capable of performing data transmission, the indication information may specifically indicate that the data transmission is any one of sending data, receiving data, and receiving and sending data. For example, when the LTE system indicates part of the sleep time of the LTE system to the other system, the other system may freely select at least part of the part of time to perform data transmission; when the LTE system directly indicates data sending time to the other system, the other system uses at least part of the part of the time to send data but not to receive data.

Figure 3:
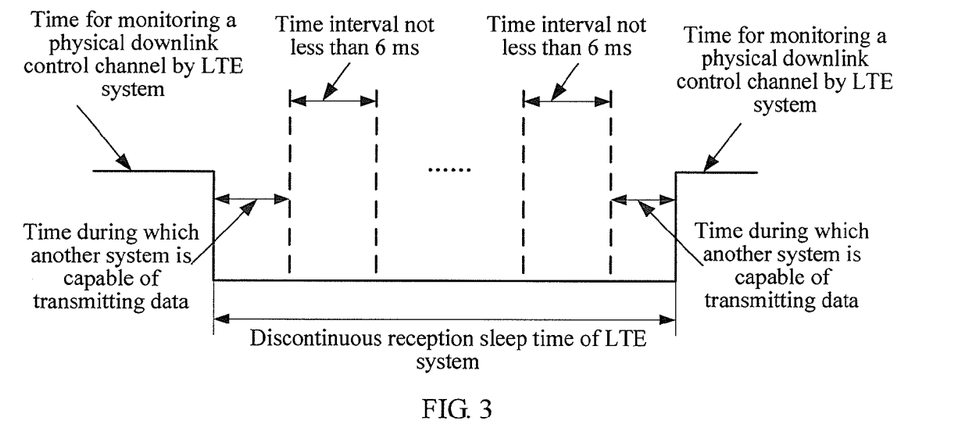
FIG. 3 is a schematic diagram of time segments for measurement by an LTE system within a DRX working period in an LTE technology according to an embodiment of the present invention.

In S12, the at least part of time during which the LTE system module is in the DRX sleep state within the current DRX period or the time during which the other system module is capable of performing data transmission, which is indicated in the indication information, may be: the whole DRX sleep time of the LTE system module within the current DRX period, for example, a time segment from time at which the LTE system module of the UE starts to sleep to time at which the DRX period ends; or the time may be: part of the whole DRX sleep time. For example, the LTE system module may allocate a part of time in the whole DRX sleep period and notify it to the other system module, so that the other system module works, that is, transmits data, by using only the part of time notified to the other system module by the LTE system module. An example is given below for brief illustration, where if it is intended to maintain a measurement function of the LTE system within the DRX sleep time, the LTE system module may indicate, to the other system, a plurality of inconsecutive time segments during which the other system can work, so that the other system can work by using a plurality of inconsecutive time segments. In the inconsecutive time segments, there are at least two neighboring time segments an interval between which is not less than 6 ms, and the time intervals are used for measurement by the LTE system. For details, reference may be made to FIG. 3. This embodiment does not limit the specific form of the part of time which is allocated and notified to the other system module by the LTE system, and the time segments in this part of time may have the same or different time lengths.

Figure 4:
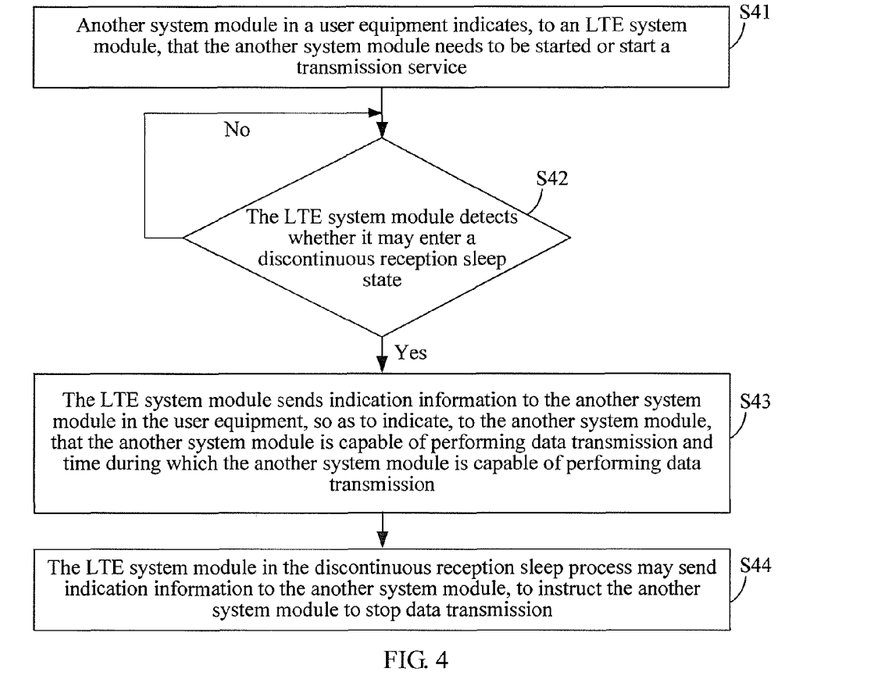
FIG. 4 is a schematic diagram of an embodiment of another method for controlling multiple communication systems in a UE to implement communication according to the present invention.

FIG. 4 is a schematic diagram of an embodiment of another method for controlling multiple communication systems in a UE to implement communication according to the present invention. The method includes the following:

S41: Another system module in a UE indicates, to an LTE system module, that the other system module needs to be started or start a transmission service. Through the indication, the LTE system module learns that the other system has a demand for data transmission. Of course, the LTE system module may also detect the demand of the other system module by itself, and carry out a subsequent operation, which is not limited in this embodiment.

S42: The LTE system module detects whether it may enter a DRX sleep state, and if yes, perform S43; if not, continue to perform S42.

S43: The LTE system module sends indication information to the other system module in the UE, so as to indicate, to the other system module, that the other system module is capable of performing data transmission and time during which the other system module is capable of performing data transmission. The transmission may be sending data, receiving data or receiving and sending data. The time during which the other system module is capable of performing data transmission is part or all of time during which the UE may sleep within a current DRX period of the UE, that is, all or part of time from sending of the indication information by the UE to the end of the current DRX period.

S44: Further, in a certain condition, the LTE system module in a DRX sleep process may send indication information to the other system module, to instruct the other system module to stop data transmission. Stopping data transmission may be stopping uplink transmission (that is, sending), stopping downlink transmission (that is, receiving), or stopping uplink and downlink transmission at the same time.

In a specific application, if the LTE system module in the DRX sleep process or in non-working time is triggered to send an SR (Scheduling Request, scheduling request), the LTE system module may send indication information to the other system module to instruct the other module to stop at least part of the transmission, and send an SR to an eNB of an LTE. The SR is used for requesting a base station for bandwidth resources for uplink sending, that is, requesting a UL grant.

Specifically, the LTE system module (that is, a UE of the LTE) may send the indication information to the other system immediately after the SR is triggered, so as to request the other system module to stop the transmission, and then the LTE system module sends the SR to the eNB.

To further ensure the operation of the other system and guarantee fairness in working of the two systems as much as possible, the UE may also send an SR to the eNB according to the following method, that is, after the SR is triggered, the LTE system module of the UE may send the SR to the eNB after the delay of T1 time. Specifically, when a T1 timer expires, the LTE module may send, to the other system, the indication information requesting stopping the transmission, and then send the SR to the eNB. Alternatively, when the T1 timer is about to expire, the UE may send, to a second system module, the indication information requesting stopping the transmission, and then send the SR to the base station after the T1 timer expires. Here, T1 may be a value preset by a system.

Alternatively, after the SR is triggered, the LTE system module of the UE may determine a time length T2 from a triggering subframe to the end of the current DRX period is smaller than a preset threshold T, and if the T2 is smaller than the T, sending of the SR is delayed, that is, the UE sends the SR to the eNB of the LTE in timing time of an on-duration timer within the next period after the current DRX period; if the T2 is greater than the T, the UE immediately sends, to the other system module, the indication information requesting stopping the transmission, and then sends the SR to the base station, or may also send the SR to the eNB of the LTE after the delay of T1 time. Here, the T1 is smaller than the T2.

In another specific application, if a current subframe of the UE satisfies any one of the following conditions, the LTE system module may send indication information to the other system module to instruct the other module to stop at least part of the transmission:

1. If current time is in a short DRX period, before a subframe number satisfies: [(SFN×10)+subframe number] mod (length of the short DRX period)=(drxStartOffset) mod (length of the short DRX period), the UE enters an operational phase of the on-duration timer at a current SFN and starts to monitor a PDCCH.

2. If current time is in a long DRX period, before a subframe number satisfies: [(SFN×10)+subframe number] mod (length of the long DRX period)=drxStartOffset, the UE enters an activation period of monitoring the PDCCH at the current SFN, which is equivalent to ending a current sleep state at an SFN$^{th}$ subframe.

3. Measurement time of the LTE system module in the sleep time expires.

Here, the SFN is a current system frame number (System Frame Number), and the drxStartOffset is used for indicating a subframe at which the on-duration timer is started within a DRX period.

Figure 5:
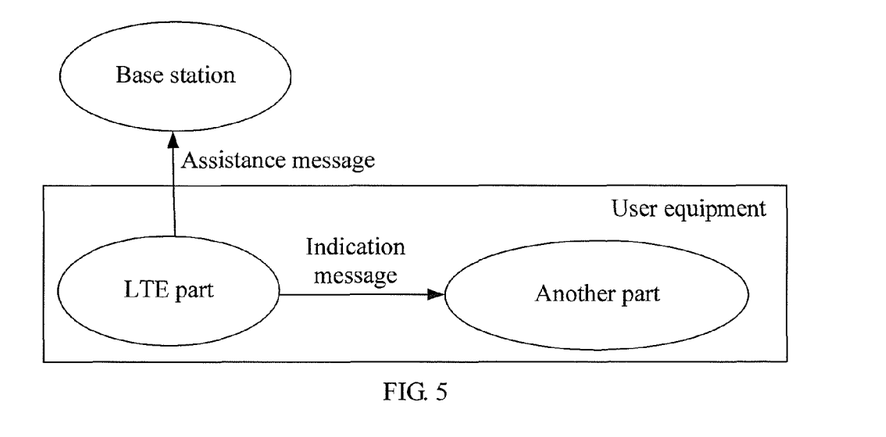
FIG. 5 is a schematic diagram illustrating that a UE provides an assistance message for a base station to assist the base station to configure a parameter related to a DRX period according to the present invention.

In each embodiment of the present invention, in order to enable the eNB of the LTE to better configure each parameter related to the DRX period of the UE, the UE may further send, to the eNB through an "assistance message", a service type of a service that the other system needs to implement or quality of service (QoS, Quality of Service) information of the service type, so that the eNB can configure a suitable parameter related to the DRX period for the UE according to the current service type of the LTE system and the current service type of the other system of the UE, thereby guaranteeing fairness in working of the UE in the two systems. For details, reference may be made to FIG. 5. Here, the service type may be a real-time service or non-real-time service. Specifically, the real-time service may be divided into a language service, a video service and the like; the non-real-time service may be web browsing, email and so on. Here, the "assistance message" is used for notifying the service type or the QoS of the service type to the base station, and its name should not be construed as a limitation. Alternatively, when learning that the other system needs to work or determining that in-device interference exists, the UE may also send a DRX mode activation request message (the message may be carried in an assistance message) to the base station, and then the base station sends a DRX mode activation message to the UE according to the request of the UE, and configures a DRX parameter for the UE. This solution may be applied to a case where DRX is not configured for the UE. The base station configures DRX for the UE so that the UE can enter a DRX state, the coordination work between two communication systems can be further performed. Further, the UE may also indicate, in the DRX mode activation request message according to working characteristics of the other system, configuration information of a DRX parameter expected by the UE, and according to the configuration information of the DRX parameter requested by the UE, the base station may activate a DRX work mode and configure a related parameter for the UE. When the UE learns that the other system does not need to work any longer, that is, determines that no in-device interference exists, the UE may send a DRX mode deactivation message to the base station to indicate that the base station may deactivate the previous DRX configuration, that is, the UE that is no longer configured with DRX will not enter the DRX state; or the UE may instruct the base station to configure a DRX parameter for the UE only based on a service of the LTE, without considering the type of the service of the other system or the QoS requirement of the service.

As introduced in the embodiment corresponding to FIG. 1, in the embodiment of the present invention, the LTE system module may be triggered by many conditions to enter the DRX sleep state or temporarily stop the transmission, which is illustrated briefly in the following with reference to the accompanying drawings.

Figure 6A:
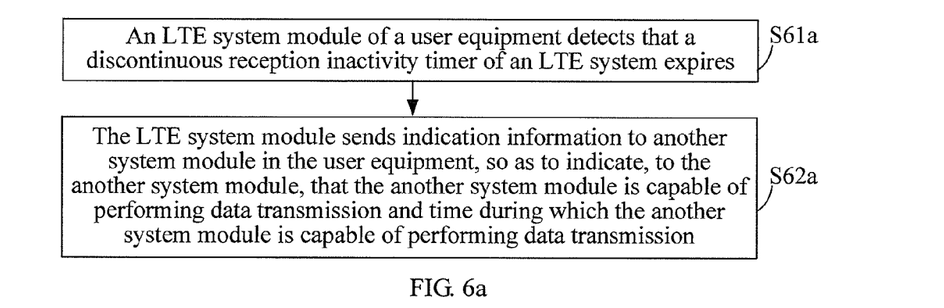
FIG. 6a is a schematic diagram of an embodiment where an LTE system module provides a transmission indication for another system module.

FIG. 6a is a schematic diagram of an embodiment where an LTE system module provides a transmission indication for another system module, including the following:

S61a: An LTE system module of a UE detects that a DRX inactivity timer of an LTE system expires.

S62a: The LTE system module sends indication information to another system module in the UE, so as to indicate, to the other system module, that the other system module is capable of performing data transmission and time during which the other system module is capable of performing data transmission. The time during which the other system is capable of performing data transmission is all or part of time from time at which the indication information is sent to the end of a current DRX period.

Figure 6B:
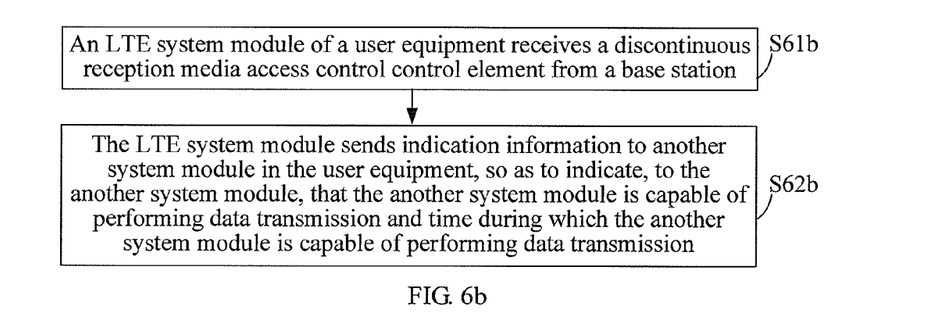
FIG. 6b is a schematic diagram of another embodiment where an LTE system module provides a transmission indication for another system module.

FIG. 6b is a schematic diagram of another embodiment where an LTE system module provides a transmission indication for another system module, including the following:

S61b: An LTE system module of a UE receives a DRX MAC control element from a base station.

S62b: The LTE system module sends indication information to another system module in the UE, so as to indicate, to the other system module, that the other system module is capable of performing data transmission and time during which the other system module is capable of performing data transmission. The time during which the other system is capable of performing data transmission is all or part of time from time at which the indication information is sent to the end of a current DRX period.

Figure 6C:
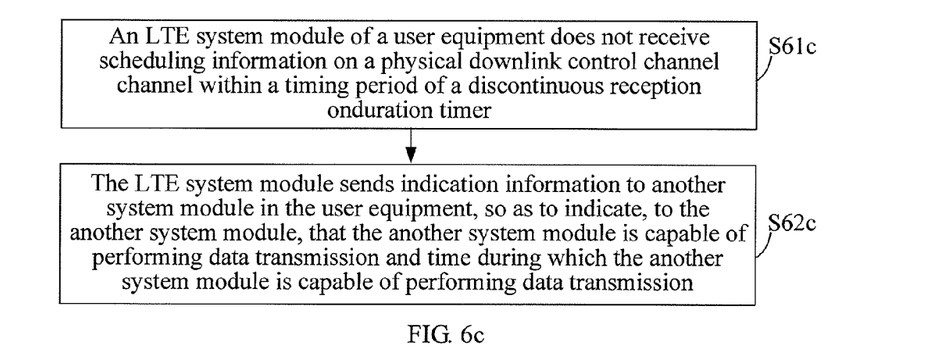
FIG. 6c is a schematic diagram of another embodiment where an LTE system module provides a transmission indication for another system module.

FIG. 6c is a schematic diagram of another embodiment where an LTE system module provides a transmission indication for another system module, including the following:

S61c: An LTE system module of a UE does not receive scheduling information on a PDCCH channel within a timing period of a DRX on-duration timer.

S62c: The LTE system module sends indication information to another system module in the UE, so as to indicate, to the other system module, that the other system module is capable of performing data transmission and time during which the other system module is capable of performing data transmission. The time during which the other system is capable of performing data transmission is all or part of time from time at which the indication information is sent to the end of a current DRX period.

Figure 6D:
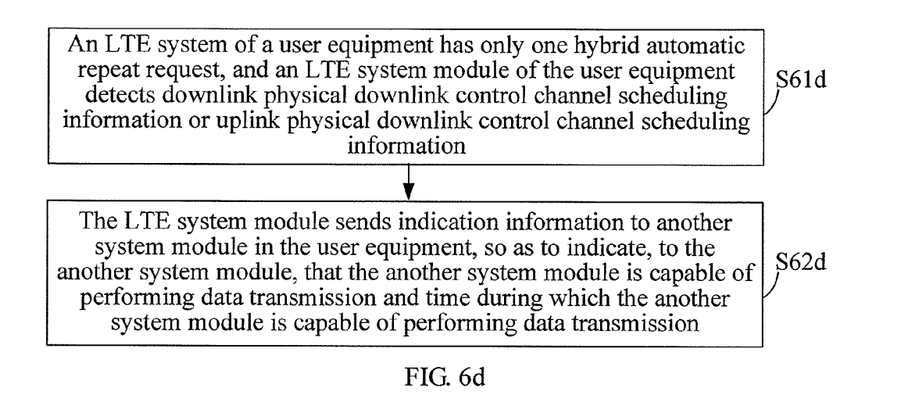
FIG. 6d is a schematic diagram of another embodiment where an LTE system module provides a transmission indication for another system module.

FIG. 6d is a schematic diagram of another embodiment where an LTE system module provides a transmission indication for another system module, including the following:

S61d: An LTE system of a UE has only one HARQ, and an LTE system module of the UE detects downlink PDCCH scheduling information or uplink PDCCH scheduling information.

S62d: The LTE system module sends indication information to another system module in the UE, so as to indicate, to the other system module, that the other system module is capable of performing data transmission and time during which the other system module is capable of performing data transmission. For example, the time during which the other system module is capable of performing data transmission may be time of at most three subframes after a current subframe.

Figure 6E:
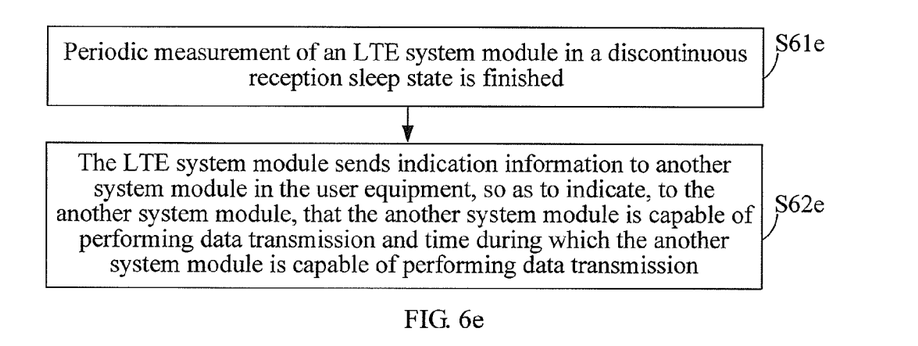
FIG. 6e is a schematic diagram of another embodiment where an LTE system module provides a transmission indication for another system module.

FIG. 6e is a schematic diagram of another embodiment where an LTE system module provides a transmission indication for another system module, including the following:

S61e: Periodic measurement of an LTE system module in a DRX sleep state is finished.

S62e: The LTE system module sends indication information to another system module in the UE, so as to indicate, to the other system module, that the other system module is capable of performing data transmission and time during which the other system module is capable of performing data transmission. The time during which the other system is capable of performing data transmission is all or part of time from time at which the indication information is sent to the end of a current DRX period.

The method for controlling multiple communication systems in a UE to implement communication is introduced in the following with reference to a specific application scenario. In this example, it is assumed that the UE is currently in idle (idle) mode of an LTE system, and the UE may still need to monitor a PDCCH channel by means of a DRX mechanism to detect a possible paging message. The DRX working mechanism in idle mode adopts a fixed period, and the function of monitoring a PDCCH is started when a paging occasion (PO, Paging Occasion) arrives. PF (Paging Frame) represents a radio frame containing one or more POs; for DRX in idle mode, the UE only monitors a PO of each DRX period. If the UE detects a paging message of the UE within activation time, the UE needs to execute network access or update system information or receive a PWS (PWS, Public Warning System, public warning system) broadcast message according to the indication of the paging message. For the specific schematic diagram of a DRX period, reference may be made to FIG. 2a FIG. 2b and FIG. 2c. In this embodiment, when the LTE system module needs to enter a DRX sleep state, the LTE system module needs to notify the other system module of this situation, so that the other system module may transmit data within the DRX sleep time of the LTE system module.

Specifically, to ensure that the UE can correctly receive the paging message in idle mode, and guarantee that the UE is not interfered by the other system while monitoring the paging message, the LTE system module of the UE may provide information for avoiding interference to the other system module through the following method: each time an on-duration timer in idle mode expires, the UE sends indication information to the other system to indicate that the other system may start the transmission, and at the same time may also indicate time at which the LTE system module starts transmission next time, so that the other system learns the time at which the LTE system module starts transmission next time, thereby avoiding the collision of working of the two modules. Alternatively, the LTE system module calculates a PO value within certain time (for example, within time of one or more PFs), and then notifies the other system module of a time value obtained by subtracting PO time, which is required for monitoring a PDCCH channel, from a DRX period, so that the other system module transmits data by using other time segments than the PO time. In this way, the two systems can carry out transmission alternately, avoiding transmitting data at the same time, thereby reducing the communication interference between different modules in the equipment. In addition, the implementation method does not need to significantly change the base station, the complexity of implementation of functions of the base station is reduced. If the UE detects a paging message of the UE within the activation time for the idle mode, the UE needs to notify the other system module immediately, to request the other system module to stop the transmission. Then, the UE executes network access or updates system information or receives an urgent PWS broadcast message according to the indication of the paging message. After the UE correctly completes the task indicated by the paging message, the UE may instruct the other system module again to start the transmission. To ensure working of another system as much as possible, the UE may also explicitly indicate that the other system module needs to stop downlink receiving, stop uplink sending, or stop uplink and downlink transmission at the same time. For example, when the UE determines according to the indication of the paging message that system information needs to be updated, the LTE system module of the UE may instruct the other system module to stop uplink transmission only, and to continue downlink receiving.

Any one or more cases in the embodiments corresponding to FIG. 6a to FIG. 6e may be used as a condition for triggering the LTE system module to send indication information to the other system module, the UE may include a function of detecting the any one or more cases, and when it is detected that a particular case occurs, the LTE system module and the other system module coordinate working through information interaction. It should be noted that, that the LTE system module sends indication information to the other system module according to all the embodiments of the present invention may be that the LTE system module directly sends the indication information to the other system module, or may also be that the LTE system module forwards the indication information to the other system module through a third-party entity. Therefore, the process of sending indication information according to all the embodiments of the present invention should be accorded the broadest interpretation, that is, the LTE system module may be coupled to the other system module in various manners to implement information interaction, but should not be simply construed as direct information interaction between the two. For example, the two modules may be coupled through wire connection or wireless connection, thereby implementing the direct information interaction of the two modules. Alternatively, an intermediate entity such as an intermediate coordinator or another device or a system may be disposed between the two modules, information is forwarded between modules of two systems through the intermediate entity, and the intermediate entity may be connected to each of the modules of the two systems in a wired or wireless manner, which is not limited in this embodiment. In addition, the solution according to the embodiment of the present invention is applicable to coordinating communication between an LTE system and another system that uses another frequency band different from the frequency band of the LTE system. When the frequency band of the LTE system is neighboring to the other frequency band (for example, when the other frequency band is an ISM frequency band), a good effect can be achieved by reducing the interference through such transmission coordination work.

Figure 7:
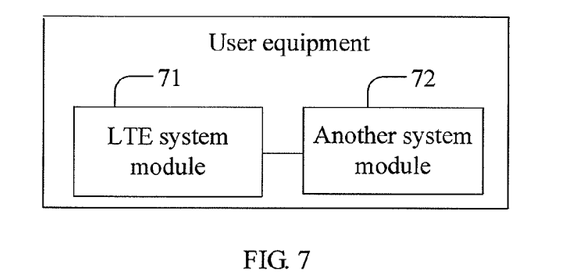
FIG. 7 is a simplified schematic structural diagram of a user equipment UE according to an embodiment of the present invention.

Corresponding to the foregoing method embodiments, an embodiment of a user equipment UE according to the present invention is illustrated in the following, where the UE may be configured to implement the flow of the method according to the foregoing embodiments. As shown in FIG. 7, the UE includes a long term evolution LTE system module 71 and another system module 72; the two modules work on different frequency bands; the LTE system module 71 may be a processor, configured to implement an LTE function; the other system module 72 is another processor, configured to implement a function of another system.

The LTE system module 71 is configured to send first indication information to the other system module 72 in the UE after a DRX inactivity timer drx-Inactivity Timer of the UE expires, or after the UE receives a DRX media access control MAC information element, or if the UE does not receive scheduling information on a PDCCH channel within a timing period of an on-duration timer of the UE and the on-duration timer expires, or if the LTE system module 71 executes only one hybrid automatic repeat request HARQ process and detects downlink physical downlink control channel PDCCH scheduling information, or after periodic measurement of the LTE system module 71 in a DRX sleep state is finished.

The first indication information is used for indicating, to the other system module 72, that the LTE system module 71 enters the DRX sleep state and at least part of time during which the LTE system module 71 is in the DRX sleep state within a current DRX period, or the first indication information is used for indicating that the other system module 72 is capable of performing data transmission and time during which the other system module 72 is capable of performing data transmission.

The other system module 72 is configured to perform data transmission within the at least part of time or within the time during which the other system module 72 is capable of performing data transmission, after receiving the first indication information.

Figure 8:
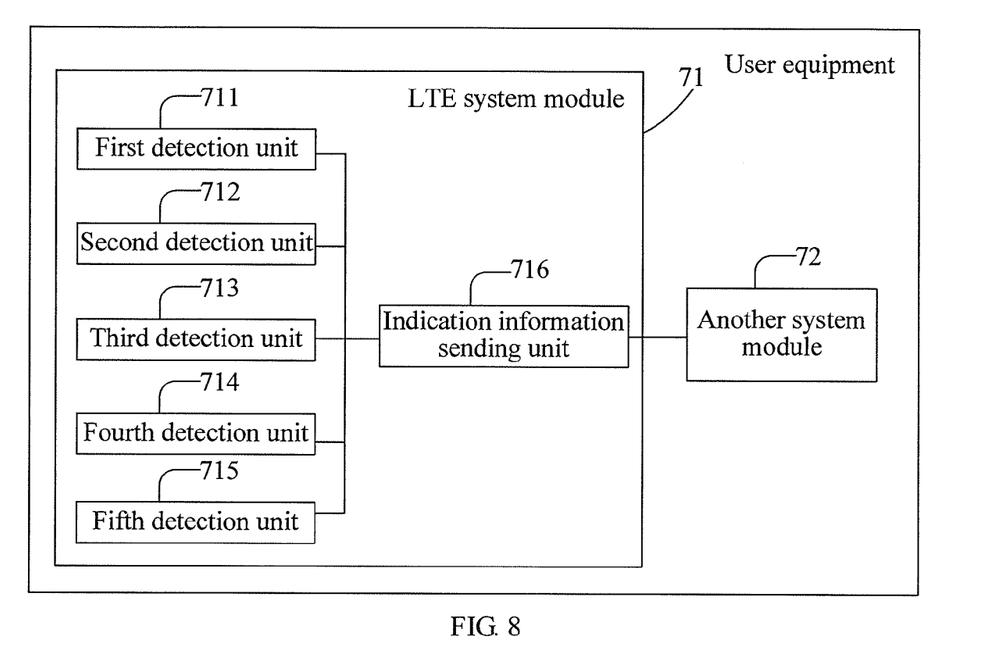
FIG. 8 is a simplified schematic structural diagram of another user equipment UE according to an embodiment of the present invention.

In a specific implementation, the LTE system module 71 includes one or a plurality of a first detection unit 711, a second detection unit 712, a third detection unit 713, a fourth detection unit 714 and a fifth detection unit 715, and an indication information sending unit 716; referring to FIG. 8, FIG. 8 shows five detection units at the same time, where each of the detection units may be a processor unit implemented through hardware, but this is merely a schematic diagram, is not intended to limit the present invention, and in an actual application, the LTE system module 71 may include only one of the five units;

the first detection unit 711 is configured to trigger the indication information sending unit 716 after detecting that a DRX inactivity timer drx-Inactivity Timer of the UE expires; or the second detection unit 712 is configured to trigger the indication information sending unit 716 after receiving a DRX media access control MAC control element; or the third detection unit 713 is configured to: if no scheduling information is received on a PDCCH channel within a timing period of an on-duration timer of the UE, trigger the indication information sending unit 716 after the on-duration timer expires; or the fourth detection unit 714 is configured to trigger the indication information sending unit 716 if the LTE system module executes only one hybrid automatic repeat request HARQ process and detects downlink physical downlink control channel PDCCH scheduling information; or the fifth detection unit 715 is configured to trigger the indication information sending unit 716 after periodic measurement of the LTE system module in a DRX sleep state is finished; and the indication information sending unit 716 is triggered by any one of the first detection unit 711, the second detection unit 712, the third detection unit 713, the fourth detection unit 714 and the fifth detection unit 715 to send the first indication information to the other system module 72 in the UE. The indication information sending unit 716 may be an interface.

Figure 9:
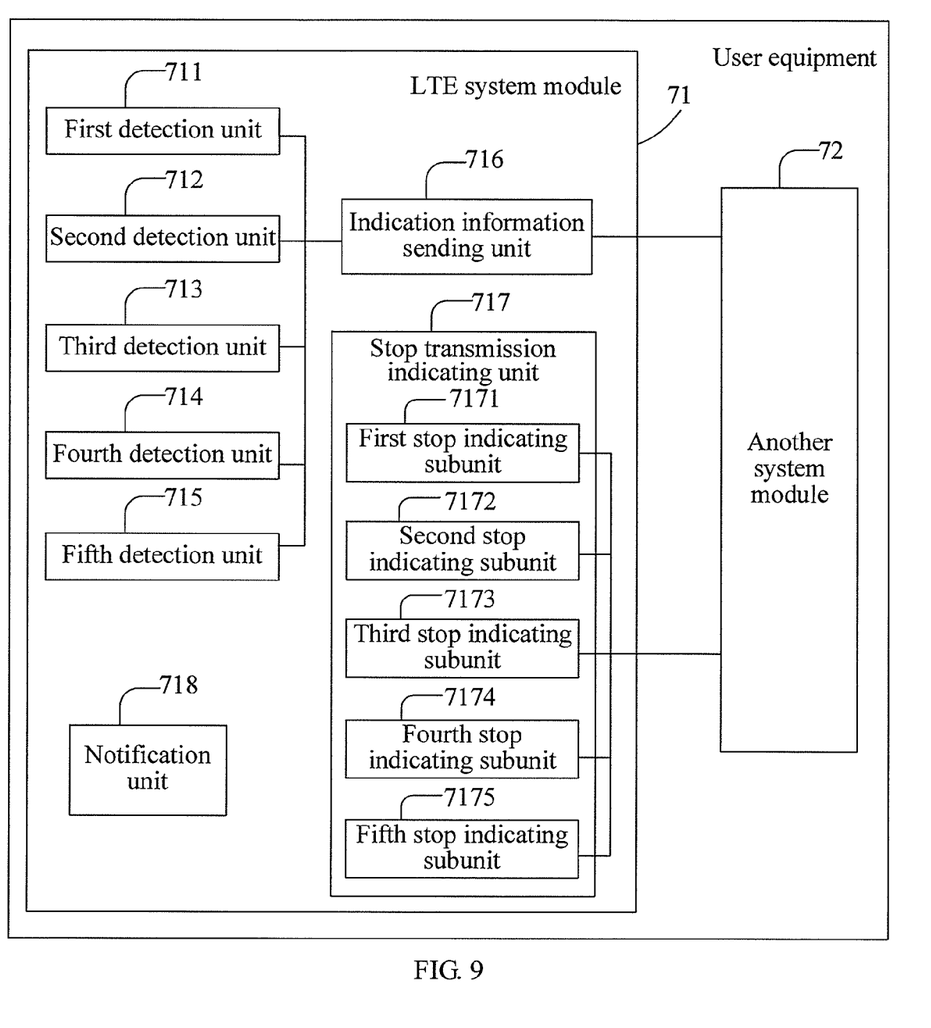
FIG. 9 is a simplified schematic structural diagram of another user equipment UE according to an embodiment of the present invention.

Further, referring to FIG. 9, the LTE system module 71 may further include: a stop transmission indicating unit 717, configured to send second indication information to the other system module 72, where the second indication information is used for instructing the other system module 72 to stop data transmission.

The stop transmission indicating unit 717 may be another processor unit, and may specifically include the following different subunits:

a first stop indicating subunit 7171, configured to send the second indication information to the other system module 72 when periodic measurement time of the LTE system module 71 in the DRX sleep state is about to expire; or a second stop indicating subunit 7172, configured to: if current time is in a short DRX period, send the second indication information to the other system module 72 before a subframe number satisfies: [(SFN×10)+subframe number] mod(length of the short DRX period)=(drxStartOffset) mod (length of the short DRX period); or a third stop indicating subunit 7173, configured to: if current time is in a long DRX period, send the second indication information to the other system module 72 before a subframe number satisfies: [(SFN×10)+subframe number] mod(length of the long DRX period)=drxStartOffset; or a fourth stop indicating subunit 7174, configured to send the second indication information to the other system module 72 if the LTE system module 71 in the DRX sleep state is triggered to send an SR; or a fifth stop indicating subunit 7175, configured to send the second indication information to the other system module 72, when the UE detects a paging message during a paging occasion, and the paging message instructs the UE to execute network access or update system information or receive a PWS message, where the SFN is a current system frame number, the drxStartOffset is used for indicating a subframe at which the on-duration timer of the UE is started within a DRX period, and the paging occasion is time for monitoring a PDCCH to obtain a paging message by the UE in idle mode within the current DRX period.

The LTE system module 71 may further include: a notification unit 718, configured to send, to a base station through an assistance message, a service type of a service that the other system module 72 needs to implement or quality of service QoS information of the service type, so that the base station configures a parameter related to the DRX period for the UE according to the service type or the QoS of the service type.

Persons of ordinary skill in the art may understand that all or a part of the steps of the method in the embodiments may be implemented by a computer program instructing relevant hardware. The program may be stored in a computer readable storage medium. When the program is run, the steps of the method in the embodiments of the present invention are performed. The storage medium may be a magnetic disk, an optical disk, a read-only memory (Read-Only Memory, ROM), a random access memory (Read-Only Memory, RAM), or the like. The embodiment of the structure of the UE is merely intended for description, its internal units or modules may be implemented through software or hardware, and possible forms of the UE include, but are not limited to, a mobile phone, a notebook computer, an iPad and other terminal devices, which is not limited in the embodiments.

The above merely describes several embodiments of the present invention, and according to the content disclosed in this application document, persons skilled in the art may make various modifications or variations to the present invention without departing from the idea and scope of the present invention. Persons of ordinary skill in the art may understand that, the embodiments or features of different embodiments may be combined with each other to form new embodiments without any collision.

What is claimed is:

1. A method for controlling multiple communication systems in a user equipment (UE) to implement communication, the UE comprising first communication circuitry configured to operate the UE in a long term evolution (LTE) communication system and second communication circuitry configured to operate the UE in a second communication system, the method comprising:

in response to detecting, at the UE, an occurrence of a first triggering condition, sending, by the first communication circuitry, first indication information to the second communication circuitry, wherein the triggering condition comprises at least one of:
  expiration of a discontinuous reception DRX inactivity timer of the UE;
  after the UE receives a DRX media access control MAC information element;
  the UE not receiving scheduling information on a physical downlink control channel (PDCCH) within a timing period of an on-duration timer of the UE;
  the first communication circuitry executing only one hybrid automatic repeat request (HARQ) process and detecting PDCCH scheduling information; or
  after periodic measurement of the first communication circuitry in a DRX sleep state is finished;
wherein the first communication circuitry and the second communication circuitry operate on different frequency bands; and
the first indication information is used for indicating, to the second communication circuitry, at least one of:
  that the first communication circuitry enters the DRX sleep state and at least part of a time during which the first communication circuitry is in the sleep state within a current DRX period; or
  that the second communication circuitry is capable of performing data transmission and a time during which the second communication circuitry is capable of performing data transmission;
wherein the method further comprises:
after sending the first indication information to the second communication circuitry, sending, by the first communication circuitry, second indication information to the second communication circuitry, wherein the second indication information is used for instructing the second communication circuitry to stop data transmission;
wherein the second indication information is sent to the second communication circuitry in response to a second triggering condition, wherein the second triggering condition comprises at least one of:
  when periodic measurement time of the LTE system module in the DRX sleep state is about to expire;
  when current time is in a short DRX period, sending the second indication information to the second communication circuitry before a current subframe number satisfies: [(SFN×10)+current subframe number] mod (length of the short DRX period)=(drxStartOffset) mod(length of the short DRX period); or
  when current time is in a long DRX period, sending the second indication information to the second communication circuitry before a current subframe number satisfies: [(SFN×10)+current subframe number] mod (length of the long DRX period)=drxStartOffset;
wherein the SFN is a current system frame number, and the drxStartOffset is used for indicating a subframe at which the on-duration timer of the UE is started within a DRX period.

2. The method according to claim 1, wherein sending, by the first communication circuitry, the second indication information to the second communication circuitry comprises:
  when the first communication circuitry in the DRX sleep state is triggered to send a scheduling request (SR), sending, by the first communication circuitry, the second indication information to the second communication circuitry.

3. The method according to claim 2, wherein sending, by the first communication circuitry, the second indication information to the second communication circuitry comprises at least one of:
  sending, by the first communication circuitry immediately after being triggered to send the SR, the second indication information to the second communication circuitry, and sending the SR to a base station;
  sending, by the first communication circuitry after a delay of T1 time after being triggered to send the SR, the second indication information to the second communication circuitry, and sending the SR to a base station; or
  determining, by the first communication circuitry after being triggered to send the SR, whether a time length T2 from a triggering subframe to an end of the current DRX period is smaller than a threshold, and if the time length T2 is smaller than the threshold, delaying sending of the SR; if the time length T2 is greater than or equal to the threshold, immediately sending the second indication information to the second communication circuitry and sending the SR to a base station, or after a delay of T1 time, sending the second indication information to the second communication circuitry and sending the SR to the base station.

4. The method according to claim 1, wherein:
  the DRX sleep state is a DRX sleep state in idle mode;
  the time during which the first communication circuitry is in the DRX sleep state within the current DRX period or the time during which the second communication circuitry is capable of performing data transmission is: time obtained by subtracting a paging occasion from total time during which the first communication circuitry is in a DRX state within the current DRX period, and the paging occasion is time for monitoring a PDCCH to obtain a paging message by the UE in the DRX sleep state in idle mode; and
  sending the second indication information to the second communication circuitry comprises: when the UE detects the paging message during the paging occasion, and the paging message instructs the UE to execute network access or update system information or receive a public warning system PWS message, sending, by the first communication circuitry, the second indication information to the second communication circuitry.

5. The method according to claim 1, wherein the second indication information is used for instructing the second communication circuitry to stop uplink data transmission, downlink data transmission, or uplink and downlink data transmission.

6. The method according to claim 1, further comprising:
  sending, by the UE, to a base station through an assistance message, a service type of a service that the second communication circuitry needs to implement or quality of service (QoS) information of the service type, so that the base station configures a parameter related to the DRX period for the UE according to the service type or QoS of the service type.

7. The method according to claim 1, further comprising:
  when the UE learns that the second communication circuitry needs to work or determines that in-device interference exists between the second communication circuitry and the first communication circuitry, sending, by the UE, a DRX mode activation request message to a base station, so that the base station configures a DRX mode and a DRX related parameter for the UE; or
  when the UE learns that the second communication circuitry needs to work or determines that in-device interference exists between the second communication circuitry and the first communication circuitry, sending, by the UE, a DRX mode activation request message to a base station, and indicating, in the DRX mode activation request message, configuration information of a DRX parameter expected by the UE, so that the base station configures a DRX mode for the UE and configures a DRX related parameter for the UE according to the configuration information of the DRX parameter expected by the UE.

8. The method according to claim 1, wherein the at least part of time during which the first communication circuitry is in the DRX sleep state within the current DRX period or the time during which the second communication circuitry is capable of performing data transmission, which is indicated in the first indication information, is: total time during which the first communication circuitry is in the sleep state within the current DRX period, or part of the total time.

9. A user equipment (UE), comprising: first communication circuitry configured to operate the UE in a long term evolution (LTE) communication system and second communication circuitry configured to operate the UE in a second communication system, wherein the first communication circuitry and the second communication circuitry operate on different frequency bands;

the first communication circuitry comprising a processor and memory coupled to the processor including instructions that, when executed by the processor, cause the first communication circuitry, in response to the UE detecting a first triggering condition, to send first indication information to the second communication circuitry, wherein the first triggering condition comprises at least one of:

expiration of a discontinuous reception DRX inactivity timer of the UE;

after the UE receives a DRX media access control MAC information element;

the UE not receiving scheduling information on a physical downlink control channel (PDCCH) within a timing period of an on-duration timer of the UE and the on-duration timer expires, the first communication circuitry executing only one hybrid automatic repeat request (HARQ) process and detecting PDCCH scheduling information; or after periodic measurement of the first communication circuitry in a DRX sleep state is finished;

the first indication information is used for indicating, to the second communication circuitry, at least one of:

that the first communication circuitry enters the DRX sleep state and at least part of a time during which the first communication circuitry is in the DRX sleep state within a current DRX period; or that the second communication circuitry is capable of performing data transmission and a time during which the second communication circuitry is capable of performing data transmission; and the second communication circuitry is configured to perform data transmission within the at least part of a time or within the time during which the second communication circuitry is capable of performing data transmission, after receiving the first indication information;

wherein the memory further includes instructions that, when executed by the processor, cause the first communication circuitry to:

send second indication information to the second communication circuitry in response to a second triggering condition, wherein the second indication information is used for instructing the second communication circuitry to stop the data transmission, wherein the second triggering condition comprises at least one of:

when periodic measurement time of the LTE system module in the DRX sleep state is about to expire;

when current time is in a short DRX period, sending the second indication information to the second communication circuitry before a current subframe number satisfies: [(SFN×10)+current subframe number] mod(length of the short DRX period)= (drxStartOffset) mod(length of the short DRX period);

when current time is in a long DRX period sending the second indication information to the second communication circuitry before a current subframe number satisfies: [(SFN×10)+current subframe number] mod(length of the long DRX period)=drxStartOffset;

when the first communication circuitry in the DRX sleep state is triggered to send a scheduling request SR; or when the UE detects a paging message during a paging occasion, and the paging message instructs the UE to execute network access or update system information or receive a public warning system PWS message;

wherein the SFN is a current system frame number, the drxStartOffset is used for indicating a subframe at which the on-duration timer of the UE is started within a DRX period, and the paging occasion is a time for monitoring a PDCCH to obtain the paging message by the UE in idle mode within the current DRX period.

10. The UE according to claim 9, wherein the memory further comprises instructions that, when executed by the processor, cause the first communication circuitry to:

send, to a base station through an assistance message, a service type of a service that the second communication circuitry needs to implement or quality of service (QoS) information of the service type, so that the base station configures a parameter related to the DRX period for the UE according to the service type or QoS of the service type.

* * * * *

UNITED STATES PATENT AND TRADEMARK OFFICE
CERTIFICATE OF CORRECTION

Page 1 of 1

PATENT NO. : 9,185,737 B2
APPLICATION NO. : 13/847398
DATED : November 10, 2015
INVENTOR(S) : Junren Chang, Yajuan Li and Shulan Feng It is certified that error appears in the above-identified patent and that said Letters Patent is hereby corrected as shown below:

On the title page item 72 Inventors:

After Junren Chang, delete "Beijing, CA (US)" and insert -- Beijing (CN) --.

Signed and Sealed this
First Day of March, 2016

Michelle K. Lee
*Director of the United States Patent and Trademark Office*